Feb. 17, 1942.  G. HARRISON  2,273,190
METHOD OF MAKING MOLDED KNOBS OR BALLS
Filed May 28, 1938  2 Sheets-Sheet 1
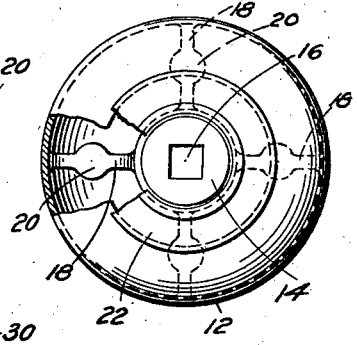
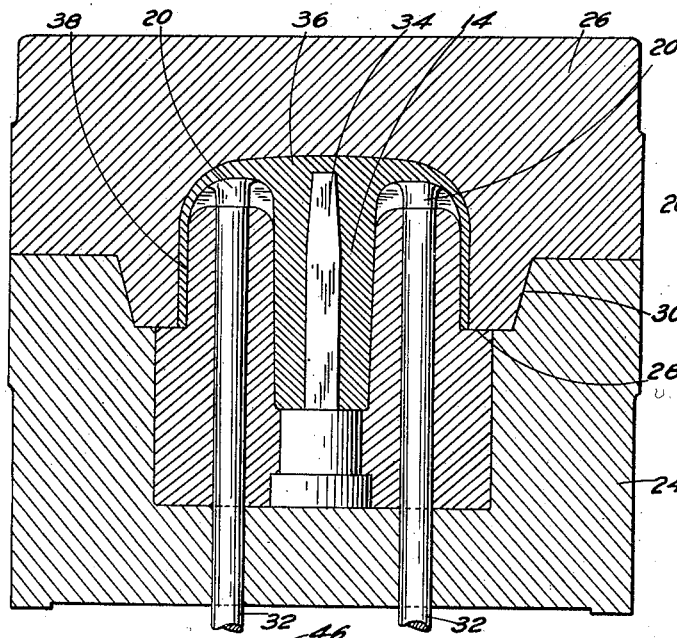
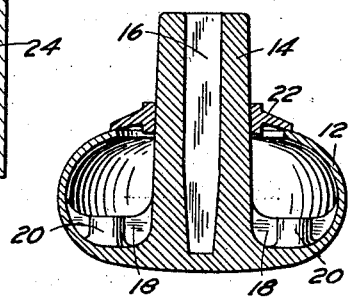
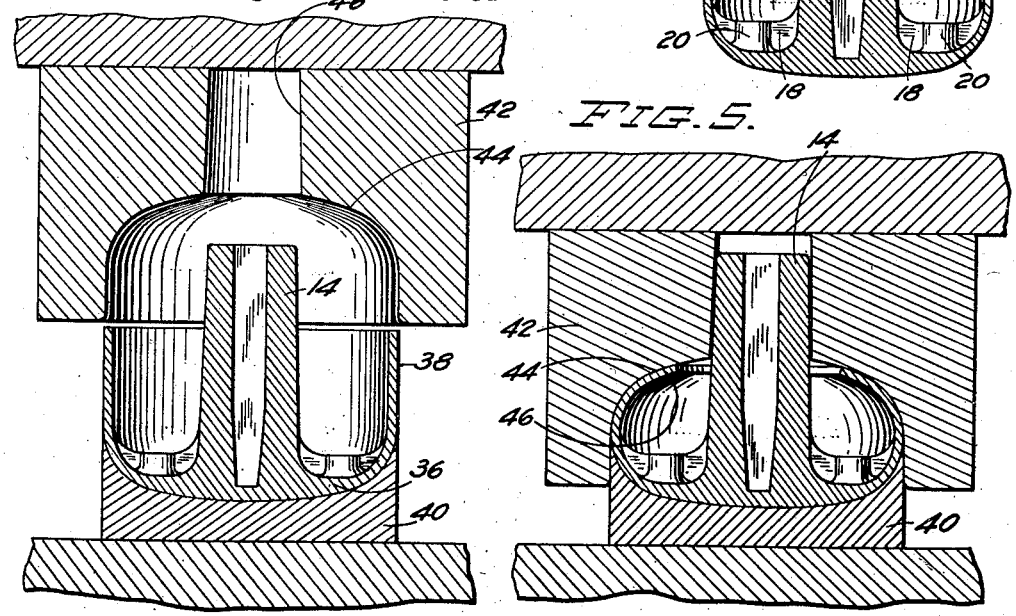
INVENTOR
GEORGE HARRISON
BY
ATTORNEY Feb. 17, 1942.   G. HARRISON   2,273,190
METHOD OF MAKING MOLDED KNOBS OR BALLS
Filed May 28, 1938   2 Sheets-Sheet 2
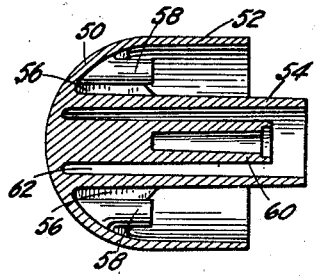
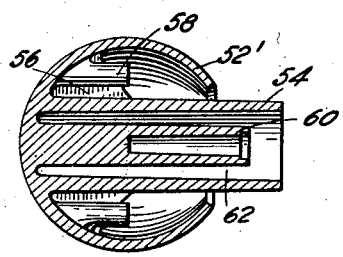
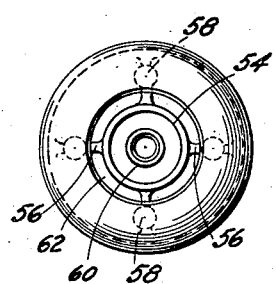
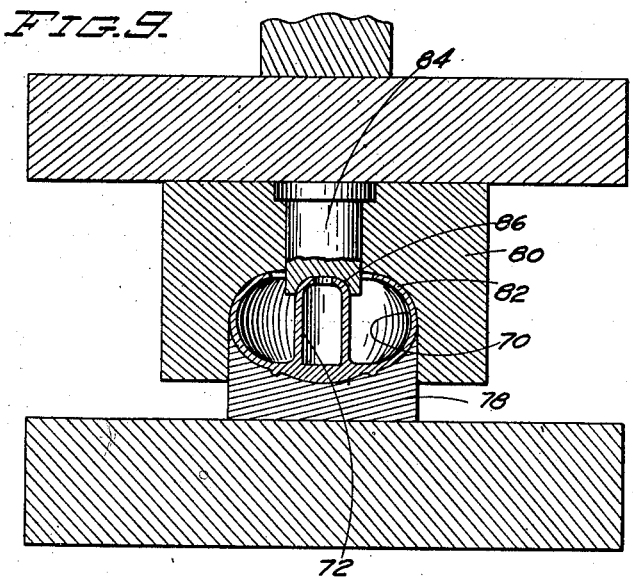
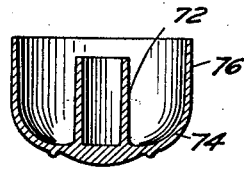
INVENTOR
GEORGE HARRISON
BY
ATTORNEY Patented Feb. 17, 1942

2,273,190

UNITED STATES PATENT OFFICE 2,273,190

METHOD OF MAKING MOLDED KNOBS OR BALLS

George Harrison, Toledo, Ohio, assignor to Doehler Die-Casting Co., Toledo, Ohio, a corporation of New York Application May 28, 1938, Serial No. 210,638

3 Claims. (Cl. 29—161)

This invention relates to the manufacture of molded products and more particularly a partly enclosed relatively thin-walled hollow body such as a door knob, gear shift ball or the like.

The primary object of my invention is to generally improve the manufacture of molded articles, and a more particular object resides in the provision of a method for manufacturing a partly enclosed relatively thin-walled hollow body out of molded material. More specifically, the object of my invention is to devise a method for manufacturing a knob or ball, for example a door knob or a gear shift lever ball, said knob or ball ordinarily necessitating and being provided with a shank or hub, and in accordance with the present invention, the shank or hub is molded integrally with the shell of the knob or ball, thus making a sturdy, inexpensive one-piece structure.

Hollow knobs and balls have already been made by molding, but not out of a single piece. The requirements of the die structure and operation have made it necessary to mold the hollow body in two halves, each half being readily molded in a simple two-part mold. However, it was then necessary to join the two halves, and this complicated the manufacturing operation; greatly increased the cost of manufacture; and created a seam at the point of maximum diameter where the exterior of the knob or ball is commonly grasped and where it is essential to have a smooth unmarred and unblemished surface. A further object of the present invention is to overcome these difficulties, and in accordance with the present invention, I preliminarily mold an embryo body similar to the outer or fully closed half of the desired body, except that it is provided with an open skirt or flange projecting in substantially cylindrical formation at the point of maximum diameter. This embryo body is an open cup-shaped body which is well adapted to be molded in a simple two-part mold even including an integrally molded shank or hub, this shank or hub projecting from the closed side toward or through the open side of the embryo body. The cylindrical skirt or flange is then bent or turned inwardly toward the shank by means of a simple forming die of elemental and inexpensive character. A single pressing operation in the forming die changes the embryo cup-shaped body to the desired finished partially or substantially enclosed hollow body. The invention is applicable to the molding of any material which is adapted to be bent, after the initial molding operation. It is applicable to many plastics, though not to the permanently infusibly thermosetting resins if fully reacted. I am particularly interested in die-cast products, and I have found that ordinary die-casting alloys readily accommodate the necessary bending operation without any evidence of breakage or splitting. A smooth exterior surface is obtained directly from the die, and finishing operations are not essential though the knob may, if desired, be given a slight finishing cut at the edge or gate, and some buffing treatment to polish the surface.

To the accomplishment of the foregoing, and such other objects as will hereinafter appear, my invention consists in the method steps and their relation one to the other, as hereinafter are more particularly described in the specification and sought to be defined in the claims. The specification is accompanied by drawings, in which:

Fig. 1 is a partially sectioned view of a door knob made in accordance with the present invention;

Fig. 2 is a section through the door knob of Fig. 1;

Fig. 3 is a section through a die showing the manner in which the embryo knob is die-cast;

Fig. 4 is a section through a forming die to which the embryo die-cast knob is transferred for a bending operation;

Fig. 5 is a section similar to Fig. 4 showing the forming die on completion of its operating stroke;

Fig. 6 is a section through a die-cast body forming a step product in the manufacture of a substantially spherical gear shift lever ball;

Fig. 7 is a section through the finished ball after the forming operation;

Fig. 8 is an end elevation of the ball of Fig. 7;

Fig. 9 is a section through a forming die showing a knob both the shank and the exterior of which are bent to complete the same; and Fig. 10 is a section through the knob of Fig. 7 prior to the forming operation and illustrating the shape in which the knob is preliminarily die-cast.

Referring to the drawings, and more particularly to Figs. 1 and 2, I there show a door knob having a partially enclosed relatively thin-walled hollow body or handle portion 12 and a shank or hub 14 which is cast integrally with the shell 12. The shank 14 is provided with a square hole 16 for receiving the usual square shaft of the door lock, and this hole 16 is formed directly as a part of the casting operation. The shell 12 is stiffened, and the connection of the shank 14 thereto is strengthened by the use of radially extending webs 18, these webs being in the present case thickened somewhat at 20. The points 20 are substantially cylindrical in configuration, and, as will later appear, are formed merely for convenient cooperation with the ejector pins of the die. The hollow shell 12 is substantially enclosed, and for many purposes the knob may be made and used as a one-piece structure. In the present case, the knob has been elaborated upon somewhat by the addition of a small die-cast ring 22, this ring being made separately from the knob and being slipped over the cylindrical shank 14 after completion of the knob.

Referring now to Fig. 3, I there show a molding die made up of an ejector die 24 and a cover die 26, these dies being separable on parting face 28. The parting face is stepped at 30, but this is merely to insure accurate registration of the ejector and cover dies. The ejector die is provided with appropriate ejector pins 32, there being four such pins in the present case. It is also provided with a core 34 for forming the square hole 16 in the shank 14 of the knob. In the present case, the core is a fixed core, but it will be understood that, if desired, the core may be made retractable, and in such case, it is connected to an appropriate core plate outside the die. For purposes of explanation of the invention, a die having a single mold cavity is sufficient, but it will be understood that in practice, the knob is preferably made in a multiple die so that a substantial number of knobs may be cast in a single casting operation. In the present case, the die portions 24 and 26 form one die cavity for use in a so-called "unit die", the unit die being a multiple die having openings therein adapted to interchangeably receive inserts such as the parts 24 and 26 in Fig. 3, which inserts have the mold cavities formed therein. In this way, a variety of different mold cavities may be provided in a single multiple die body.

It will be observed that the die-cast body produced in the mold is not an enclosed hollow body like the finished knob. The outer wall 36 is exactly like that of the finished knob, but in place of the in-turned or partially closed inner wall, I provide an open skirt or flange 38. When dealing with a circular knob, as in the present case, this skirt or flange is cylindrical, and it has a diameter equalling the outer or maximum diameter of the knob. However, the hollow article need not be a door knob, and even if a knob, it may be elliptical or of other shape, instead of circular, as shown.

In Fig. 3, it will be noted that the enlargements 20 are aligned with the ejector pins 32. The gate leading into the mold cavity is not shown in the drawings, but the die may be gated in any conventional or convenient manner, and is preferably gated at the open edge of the skirt 38, that is, at the parting face 28 of the die.

The embryo die-cast knob, after removal of the gate, is placed in a simple two-part forming die, the nature of which will be clear from inspection of Figs. 4 and 5. It will be understood that the die is mounted in an ordinary standard press, the lower part 40 being secured to the table of the press, and the upper part 42 being secured to the reciprocable head. The lower part 40 of the die is formed with a curved seat dimensioned to mate with the outer wall 36 of the knob. The upper part 42 of the forming die is curved at 44 to conform to the desired shape of the inner wall of the knob. This part of the die is also cut away as shown at 46 to receive the shank 14.

The function of the forming die will be evident from inspection of Fig. 5 showing the die in closed position at the end of the press stroke. When the press is tripped for the usual single revolution or cycle of operation, the upper portion 42 descends and the curved wall 44 bends or turns the skirt 38 inwardly to the position shown at 46 in Fig. 5. This simple rapid step completes the formation of the knob, except for minor details, such as the provision of a hole through shank 14 for the usual set-screw, and the addition of the finishing ring 22 if such a ring is to be used.

The invention may be applied to the manufacture of a substantially spherical ball such as the gear shift lever ball of an automobile. The method of the invention will be clear by reference to Figs. 6, 7, and 8 of the drawings. The die-cast body has a substantially hemispherical end 50 and a cylindrical skirt 52 projecting from end 50. A suitable hub or shank 54 is cast integrally with the end 50. The thin-walled exterior of the shell is strengthened and rigidified by webs 56, and these may be enlarged at 58 for cooperation with ejector pins, all as was previously described. In the present case, the ball is provided with a somewhat unusual double-walled shank, there being an inner wall 60 in addition to the outer wall 54, these being separated by the deep annular passage 62. The complete double walled shank is formed directly in the die-casting operation and does not add appreciably to the cost of manufacture of the ball.

The casting is next transferred to a forming die similar to that previously described but having its lower and upper portions shaped to conform to the surface of a sphere. The forming die functions to turn or bend the cylindrical skirt 52 inwardly, thus changing it from the shape shown at 52 in Fig. 6 to the shape shown at 52' in Fig. 7.

Still another example of the invention is illustrated in Figs. 9 and 10, the embryo die-cast knob being shown in Fig. 10 and the completed knob after the forming operation being shown in Fig. 9. In this case, not only the exterior shell 70 is a hollow partially enclosed body, but also, the shank 72 is a hollow partially enclosed body. The problem of molding both of these parts is solved in exactly the same way. Thus, referring to Fig. 10, the outer wall 74 is cast in finished form, but in place of the inner wall, I provide the cylindrical skirt or extension 76. Similarly, the shank 72 is cast in cylindrical form. The casting is transferred to a forming die the lower portion 78 of which is shaped to conform to and to supportingly receive the outer wall 74 of the knob. The upper portion 80 of the forming die is curved at 82 to turn the skirt 76 inwardly. An insert 84 is fitted into upper portion 80, and the lower end of this insert is shaped at 86 to turn the end of shank 72 inwardly. In this way, at the completion of the forming stroke, the die-cast metal of the knob is turned inwardly both at 82 and at 86, and only a single forming operation is needed to complete the knob, despite its complex shape, a shape which it would be impracticable, if not altogether impossible, to die-cast in finished form.

It is believed that the method of my invention, as well as the many advantages thereof, will be apparent from the foregoing detailed description. The method possesses all of the numerous advantages which characterize die-casting in general, such as the ability to produce complex shapes including detailed ornamentation, and the production of a piece which is smooth-surfaced and of finished dimension. The desired article may be made at a rapid production rate, and no machining is needed, even for finishing the squarehole in a door knob for example. A shank or hub is produced which is formed integrally with the knob, and there is no possibility of the knob becoming loose or rotating free of the hub. There is no need to make the knob of solid metal, and although made hollow, the knob does not require a sand core or other destructible core. The mold is a simple, inexpensive two-part mold, and the forming die is also simple and inexpensive. Nevertheless, the knob is not made in halves and there is no need for manufacturing steps intended to join open halves, with consequent production of a seam at the worst point, that is, the periphery of the knob. With a seam at this point, it is necessary to finish the periphery of the knob in order to obtain a passable smooth surface, but this extra manufacturing treatment is not needed in the practice of my improved process.

It will be apparent that while I have shown and described the practice of my invention in preferred ways, many changes and modifications may be made in the method disclosed without departing from the spirit of the invention defined in the following claims.

I claim:

1. In the manufacture of a one-piece hollow molded knob or ball having a central axially extending integrally made shank or hub-projecting from one side toward and through the opposite side, the method which includes preliminarily molding an embryo body having the desired shank, said body resembling the desired finished body except that it is provided with an annular substantially cylindrical flange or skirt surrounding said shank and projecting for a substantial distance from the body at the point of maximum diameter and thus constituting an open body adapted to be molded in and ejected from a simple two-part mold, and thereafter bending the aforesaid skirt or flange inwardly toward the shank so substantial an amount as to at least partially close the hollow body to form the desired knob or ball.

2. In the manufacture of a one-piece hollow molded knob or ball having a central axially extending integrally made shank or hub projecting from one side toward and through the opposite side, with integrally made stiffening webs disposed radially about and extending outwardly from the shank or hub, the method which includes preliminarily molding an embryo body having the desired shank and radial webs, said body resembling the desired finished body except that it is provided with an annular substantially cylindrical flange or skirt surrounding said shank and projecting for a substantial distance from the body at the point of maximum diameter and thus constituting an open body adapted to be molded in and ejected from a simple two-part mold, and thereafter bending the aforesaid skirt or flange inwardly toward the shank so substantial an amount as to at least partially close the hollow body to form the desired knob or ball, said radial webs being located within the point of maximum diameter in order not to interfere with inward bending of the skirt or flange.

3. In the manufacture of a one-piece hollow molded knob or ball having a central axially extending integrally made shank or hub projecting from one side toward and through the opposite side, with integrally made stiffening webs disposed radially about and extending outwardly from the shank or hub, the method which includes preliminarily molding an embryo body having the desired shank and radial webs, said body resembling the desired finished body except that it is provided with an annular substantially cylindrical flange or skirt surrounding said shank and projecting for a substantial distance from the body at the point of maximum diameter and thus constituting an open body adapted to be molded in and ejected from a simple two-part mold, ejecting said body by means of ejector pins disposed parallel to the shank and skirt and bearing against the aforesaid radial webs, and thereafter bending the aforesaid skirt or flange inwardly toward the shank so substantial an amount as to at least partially close the hollow body to form the desired knob or ball, said radial webs being located within the point of maximum diameter in order not to interefere with inward bending of the skirt or flange.

GEORGE HARRISON.